United States Patent
Esser et al.

(10) Patent No.: US 8,371,585 B2
(45) Date of Patent: Feb. 12, 2013

(54) OIL WIPER RING

(75) Inventors: Peter-Klaus Esser, Kürten (DE); Dirk Bärenreuter, Odenthal (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 33 days.

(21) Appl. No.: 12/664,536

(22) PCT Filed: Apr. 15, 2008

(86) PCT No.: PCT/DE2008/000665
§ 371 (c)(1),
(2), (4) Date: Dec. 14, 2009

(87) PCT Pub. No.: WO2008/151589
PCT Pub. Date: Dec. 18, 2008

(65) Prior Publication Data
US 2010/0176557 A1 Jul. 15, 2010

(30) Foreign Application Priority Data
Jun. 13, 2007 (DE) .......................... 10 2007 027 815

(51) Int. Cl.
*B60T 11/236* (2006.01)
*F16J 9/12* (2006.01)
(52) U.S. Cl. ........................................ 277/434; 277/459
(58) Field of Classification Search .................. 277/434, 277/442, 443, 444, 459
See application file for complete search history.

(56) References Cited

U.S. PATENT DOCUMENTS

| 2,511,874 A * | 6/1950 | Phillips .......................... 277/444 |
| 2,657,962 A | 11/1953 | Robinson |
| 2,912,292 A * | 11/1959 | Lawitschka .................... 277/444 |
| 5,295,696 A * | 3/1994 | Harayama et al. ............. 277/443 |
| 6,860,485 B2 * | 3/2005 | Masuyama et al. ............ 277/434 |
| 7,077,402 B2 * | 7/2006 | Katumaru et al. ............. 277/434 |
| 7,117,594 B2 * | 10/2006 | Preyer ......................... 29/888.07 |
| 7,354,045 B2 * | 4/2008 | Abe et al. ....................... 277/435 |
| 7,510,196 B2 * | 3/2009 | Nanno et al. ................... 277/465 |
| 7,797,829 B2 * | 9/2010 | Yamada et al. ........... 29/888.075 |

(Continued)

FOREIGN PATENT DOCUMENTS
DE 2324931 A1 1/1974
DE 3318208 C * 10/1984
(Continued)

*Primary Examiner* — Vishal Patel
(74) *Attorney, Agent, or Firm* — Robert L. Stearns; Dickinson Wright, PLLC

(57) ABSTRACT

An oil wiper ring, comprising a body with a radially external running surface, an inner circumferential surface and an upper and lower face, and which possesses at least two slide ribs, which may be provided with a wear-resistant layer, such ribs becoming conically thinner, in the radial direction of their end faces, and which are opposite a sliding mating surface, such that they proceed from the body, at a specifiable angle, in order to form an angled side face, so that the free end of each slide rib, commencing in the region at the oil chamber side, is shaped to slope towards an area at the combustion chamber side, such that the associated transitional areas, on the one hand, from the region of the circumferential slide rib towards the angled side faces, and on the other hand, from the angled side faces to the piston ring body, are rounded, i.e. have predetermined radii.

12 Claims, 1 Drawing Sheet

U.S. PATENT DOCUMENTS

2006/0081126 A1 * 4/2006 Yamada et al. ................. 92/248
2006/0113730 A1 * 6/2006 Suzuki et al. ................. 277/434

FOREIGN PATENT DOCUMENTS

| | | | | |
|---|---|---|---|---|
| DE | 4236641 | A1 | | 12/1993 |
| DE | 60302321 | T2 | | 6/2006 |
| EP | 937922 | A2 | * | 8/1999 |
| EP | 1557594 | A | | 7/2005 |
| GB | 2129091 | A | * | 5/1984 |
| JP | 01164868 | A | * | 6/1989 |
| JP | 07158736 | A | * | 6/1995 |
| JP | 09144881 | A | * | 6/1997 |
| JP | 09196172 | A | | 7/1997 |
| JP | 2002071021 | A | * | 3/2002 |

* cited by examiner

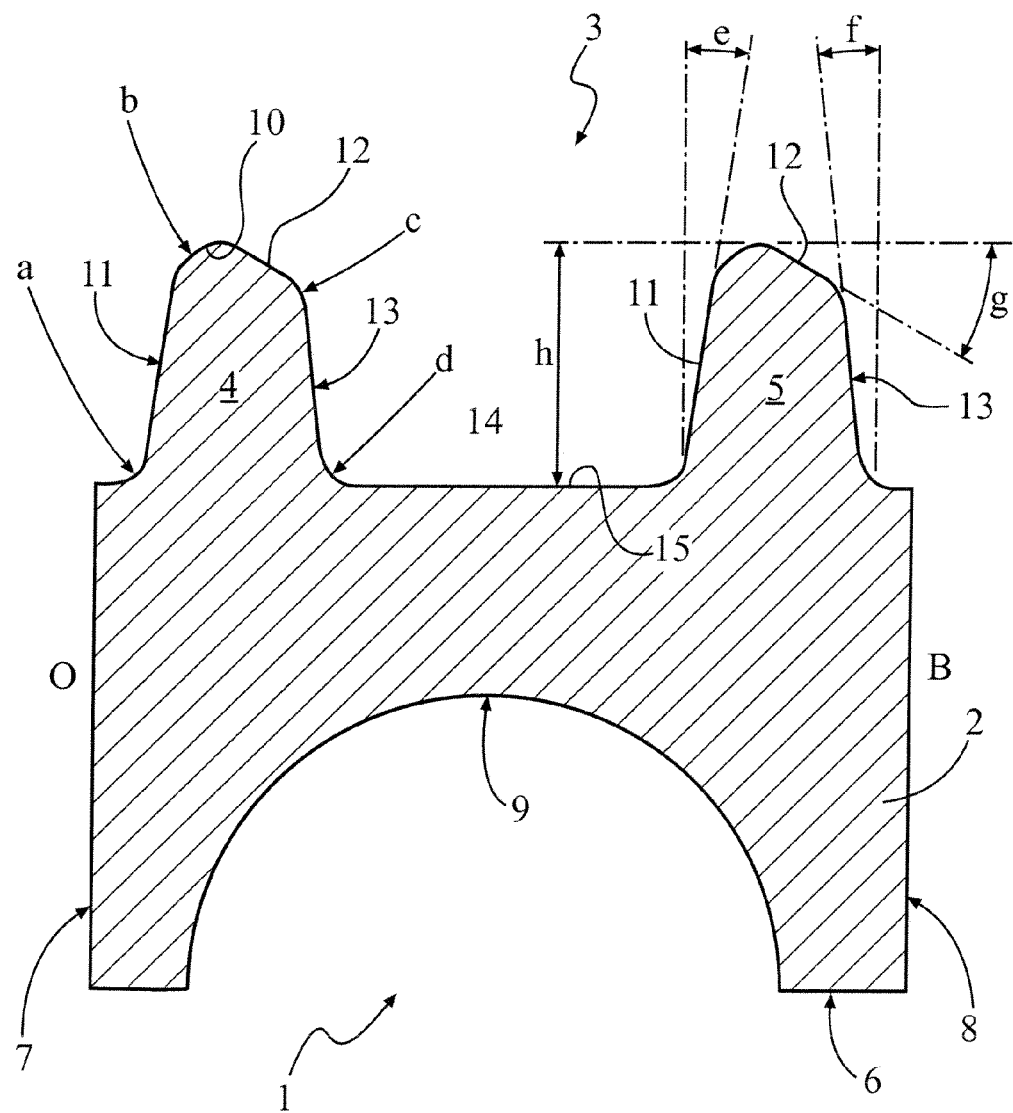

OIL WIPER RING

BACKGROUND OF THE INVENTION

1. Technical Field

The invention concerns an oil wiper ring, consisting of a body with one radially external running surface, one inner circumferential surface and an upper and a lower face.

2. Related Art

DE 42 36 641 A discloses an oil wiper ring for internal combustion engines, that is fixed into a groove in a piston, which is moving back and forth within an engine cylinder, and which possesses an outer running surface that is constantly pressed against the cylinder wall by means of the effect of a spring-like expansion device provided within the piston groove, in which the outer running surface is defined by at least two ring-shaped areas (slide ribs) which are concentric, have the same diameter and which are separated by circumferential recesses in the outer wall of the ring, for which purpose each ring-shaped region of the outer sliding surface is inclined upwardly and inwardly, in order to define a conically-shaped surface.

DE 2 324 931 A describes a process and a device for the manufacture of chrome-plated rings for piston grooves. The piston ring for use as an oil wiper ring possesses two circular slide ribs, which have differently shaped geometric structures, and which are provided with a running surface layer.

In JP 9-196172 A an oil wiper ring is described, consisting of a body, which is provided with at least one circular slide rib, wherein the body is located in working contact with a spring element which presses radially outwards. The circular slide ring decreases in diameter in the direction of its free end, and may be provided at its free end with different contours (radii, chamfers or similar).

Within the field of combustion engines, oil wiper rings serve to minimize the oil consumption of an internal combustion engine. As can be seen in the state of the art, a number of design embodiments are known, which are intended to serve this purpose, but which are not always optimally effective.

SUMMARY OF THE INVENTION AND ADVANTAGES

The invention is based on the task of further developing an oil wiper ring, in particular as derived from JP 9-196172 A, so that it gives improved oil scraping behavior over its operating life.

This task is solved by means of an oil wiper ring, comprising a body with a radially external running surface, an inner circumferential surface and an upper and lower face, and which possesses at least two slide ribs, which may be provided with a wear-resistant layer, such ribs becoming conically thinner, in the radial direction of their end faces, and which are opposite a sliding mating surface, such that they proceed from the body, at a specifiable angle, in order to form an angled side face, so that the free end of each slide rib, commencing in the region at the oil chamber side, is shaped to slope towards an area at the combustion chamber side, such that the associated transitional areas, on the one hand, from the region of the circumferential slide rib towards the angled side faces, and on the other hand, from the angled side faces to the piston ring body, are rounded, i.e. have predetermined radii.

The oil wiper ring in accordance with the invention has been made available with a geometric contour which, if necessary, can be provided with a wear-resistant layer, in particular a chrome layer.

In this manner, in addition to an optimized oil scraping behaviour, a simplified process sequence and consequently a resultant cost advantage are promoted, when compared with the state of the art.

The object of the invention brings with it the following advantages:

Linear contact of the circular slide rib(s) at commencement of engine operation, resulting in high surface pressure and a good oil scraping performance during the warm-up stage.

No sharp edges in the region of the free end of the slide rib concerned, which might lead to damage to the mating running surface, in particular on cylinder liners During the operation of the engine, a supporting surface is formed, which remains comparatively narrow, even after a substantial operating period.

The intended conicity of the circular slide ribs has a positive influence on oil consumption.

The object of the invention is demonstrated with reference to an example of a single embodiment in the sole drawing which is a cross-section of the oil wiper ring.

DETAILED DESCRIPTION

The single FIGURE shows an oil wiper ring 1, which, in this example, is shown as a cast iron ring. Without abandoning the subject area covered by the patent, a steel ring can also be used. The oil wiper ring 1 comprises a body 2 with a radial outer running surface 3, formed by two slide ribs 4,5, an inner circumferential surface 6, an upper face 7 and a lower face 8. The inner circumferential surface 6 includes a groove area 9, which serves to accommodate a spring element which is not further represented.

Since none of the surrounding components are shown, the face 7 should face an oil chamber 0 and the side 8 should face a combustion chamber B. Both of the slide ribs 4,5 are produced in geometrically identical form in this example, although other types of contours could also be envisaged. Commencing at face 7, a transitional area with a radius is provided, which blends into a side face 11 conically angled in the direction of the end area 10. The free end 10 of the slide rib 4 is formed of transitional area with a radius b, which blends to join into an inclined (declining) area 12, which slopes in the direction of the combustion chamber B. At the end of the sloping region 12 there is a further transitional region with radius c, which also blends into an angled face (conically) extending at an angle in the direction of the body 2. Towards the ring body a further transitional region is provided, having a radius d. In this example, the slide rib 5 is formed in a similar manner to slide rib 4, although this is not an obligatory choice. The angle of conicity of the angled side face 11, which faces the region 0 of the oil chamber, is indicated by e. The angle of conicity of the angled side face 13, which faces the region B of the combustion chamber, is indicated by f. The sloping region 12 runs between the free end 10 and the angled side face 13 at an angle g.

In this manner, a groove 14 is formed between the slide ribs 4,5, which are separated from one another and which form an oil reservoir. Although not represented here, it is also possible, to provide for radially proceeding oil channels between the floor of the groove 15 and the groove region 9. The slide ribs 4,5 are produced in this example with the same height h, which however is not an absolutely necessary condition. In the following list the geometric relationships for the oil wiper ring 1 are explained in more detail:

a R 0.05 to 0.20 mm
b R 0.05 to 0.20 mm (particularly R0.10 to 0.15 mm)

c R 0.05 to 0.20 mm
d R 0.05 to 0.20 mm
e 0.5 to 15° (preferably 8 to 12°
f 5 to 15° (preferably 8 to 12°
g 0.5 to 50° (preferably 25 to 40°
h 0.2 to 0.8 mm (preferably 0.3 to 0.6 mm).

The angles e and f are shown in this example as being formed with a slight difference.

At least the slide ribs 4,5 can be provided with a wear-resistant layer, for example chrome based, although other types of coating, such as PVD or similar, could be envisaged.

Under operating conditions, the relevant end region 10 therefore mates with the mating surface, which is not further represented, at which time there is initially a linear contact between the relevant end region 10 and the mating surface. This gives rise to a high surface pressure and a good scraping behaviour during the warm-up stage.

During further operation of the engine, a support surface is produced in the region of the free ends 10, which is relatively narrow, even after a substantial operating period. The conicity of the slide ribs 4,5 continues to have a positive influence on oil consumption.

What is claimed is:

1. An oil wiper ring, comprising: a wiper ring body (2) having, a radially inner surface (6), laterally opposed upper (7) and lower (8) flanks and at least two slide ribs (4, 5) which conically taper from the wiper ring body (2) to their free ends (10) and have laterally opposed and angled side faces (11, 13) which slope toward one another at predetermined associated angles (e, f), wherein respective transition regions (b, c, d) are rounded with defined radii from a bevelled region (12) of the contact surface of the slide ribs (4,5) into the angled side faces (11, 13) and from the angled side faces (11, 13) into the wiper ring body (2); and wherein the free end (10) each of said slide ribs (4,5), starting with a region on an oil chamber (O) side of the wiper ring body (2) is bevelled (12) towards a combustion chamber (B) and the angled side face (11) facing the oil chamber (O) runs from the wiper ring body (2) in the direction of the free end (10) of the slide ribs (4,5) at an angle (e) of between 0.5 and 15° relative to a radial direction and the angled side face (13) facing the combustion chamber (B) runs from the wiper ring body (2) in the direction of the free end (10) of the slide ribs (4,5) at an angle (f) of between 0.55 and 15° relative to the radial direction and the transitional zone between the angled side face (11) facing the oil chamber (O) and the bevelled region (12) has a radius (b) of between 0.05 and 0.2 mm and the transitional zone from the beveled region (12) into the angle side face (13) facing the combustion chamber (B) has a radius (c) of between 0.05 and 0.2 mm and the transitional zone form the angle side face (13) facing the combustion chamber (B) into the wiper ring body (2) has a radius (d) of between 0.05 and 0.20 mm and the beveled region (12) is inclined at a slope angle (g) of 5 to 50° and the slope angle is greater than either of the side face angles (e,f).

2. An oil wiper ring in accordance with claim 1, wherein the transitional zones between the upper (7) and lower (8) flanks of the wiper ring body (2) into the angled side faces (11, 13) of the slide ribs (4,5) have radii (a) of between 0.05 and 0.20 mm.

3. An oil wiper ring in accordance with claim 1, wherein the angled side face (11) facing the oil chamber has a greater pitch than the angled side face (13) facing the combustion chamber (B).

4. An oil wiper ring in accordance with claim 1, wherein the slide ribs (4,5), have a height (h) of between 0.2 and 0.8 mm.

5. An oil wiper ring in accordance with claim 4, wherein the radial height (h) of the slide ribs (4,5), is between 0.3 and 0.6 mm.

6. An oil wiper ring in accordance with claim 1, wherein the radius (b) of the transitional region of the angled side face (11) facing the oil chamber (O) and the bevelled region (12) is between 0.10 and 0.15 mm.

7. An oil wiper ring in accordance with claim 1, wherein the angled side faces (11) of the slide ribs (4,5) facing the oil chamber (O), extend at angles (e) of between 8 and 12°.

8. An oil wiper ring in accordance with claim 1, wherein the angled side faces (13) of the slide ribs (4,5) facing the combustion chamber (B), extend at angles (f) of between 8 and 12°.

9. An oil wiper ring in accordance with claim 1, wherein the slope angle (g) of between 25 and 40°.

10. An oil wiper ring in accordance with claim 1, wherein both of the slide ribs (4,5) possess substantially the same geometric contours.

11. An oil wiper ring in accordance with claim 1, wherein the body (2) is made of cast iron.

12. An oil wiper ring in accordance with claim 1, wherein the body is made of steel.

* * * * *